3,342,731
METHOD FOR DEWATERING SLUDGES
Gotthold Paul Baumann, 7 Lessingstrasse, and Gunter Erich Joseph Thomas, 26 Staufenstrasse, Frankfurt am Main, Germany
No Drawing. Filed Sept. 21, 1964, Ser. No. 398,078
Claims priority, application Germany, Sept. 24, 1963, M 58,308
8 Claims. (Cl. 210—45)

This invention relates to the treatment of sludges resulting from the treatment of municipal and industrial sewages. More specifically, this invention relates to a method of dewatering fresh or digested sludges or centrate resulting from centrifuging fresh or digested sludge.

It is an object of this invention to provide a method of improving the filterability of centrate resulting from centrifuging of fresh or digested sludge by addition of ash or lime or both.

Another object is to provide a method of improving the dewatering characteristics of fresh or digested sludge by addition of ash or lime or a combination of both.

Another object is to provide a method of dewatering sludge whereby the solids removed from the sludge are utilized to provide ash and lime necessary.

Another object is to provide an efficient method of dewatering sludges by centrifuging followed by filtration.

Another object of this invention to provide a process of this general type which is effective and economical.

Other objects will become apparent upon consideration of the detailed description and claims which follow.

The term "fresh sludge" as used herein denotes sludge from a primary clarifier or that from a secondary clarifier following a biological treatment in an activated sludge aeration basin or a trickling filter, or a mixture of such sludges. The term "digested sludge" as used herein denotes anaerobically digested or decomposed sludge.

The terms "filter cake" or "centrifuge cake" refer to the highly dewatered residue resulting from a dewatering process. "Centrate" denotes the sludge-water mixture, containing fine and colloidal solids, remaining after removal of the coarser solids by centrifuging. "Filtrate" denotes a liquid substantially free from solids remaining after the separation of the solids by filtration.

Sludges resulting from the treatment of municipal sewages are usually digested in special apparatus. The organic matter present in the fresh sludge is biologically decomposed into methane, other gases, and mineralized residues. During decomposition consolidation occurs, so that the solids content of the digested sludge is higher than that of fresh sludge. Decomposition of fresh sludge to digested sludge, in addition to resulting in a higher solid matter content, also reduces putrefaction. Hitherto, digested sludge has been dewatered on drying beds to remove the bulk of the moisture and then disposed of as fertilizer or fill. With the rapid growth of large cities and industries, dewatering on drying beds is often no longer feasible because of the large quantities of sludge to be dewatered and the great area required for such beds. Also the sales potential for sludge as fertilizer is limited. Today, instead of dewatering sludge on drying beds, space-saving methods such as screening, heat drying, and incineration are used. These methods are also applicable to fresh sludges.

Sludges may also be dewatered by filtering, centrifuging, or by a combination of the two methods. A centrifuge and filter can be arranged so that centrate resulting from centrifuging sludge is thereafter filtered. Dewatered sludge is incinerated. In this well-known method diatomaceous earths may be added in the mechanical and biological clarification step, during sludge thickening, ahead of the sludge filtration or centrifugation, or ahead of filtration of the centrate to aid in dewatering the sludge. Diatomaceous earths can be replaced with ash from the incineration of the centrifuge and filter cakes.

It is also known that filterability of sewage sludges can be increased by the addition of flocculants, especially salts of iron and aluminum, and organic polyelectrolytes. Such methods have been found disadvantageous because of the large quantities of chemicals often required and the adverse effect these chemicals have upon the composition of the sludge.

In a further development of this method it has been proposed to add ash resulting from the incineration of sludge to digested sludge or fresh sludge or to centrate resulting from centrifuging raw or digested sludge as a filter aid. In this way no additional chemicals are necessary. The filter and centrifuge cakes may be incinerated, either separately or together, depending on the particular installation, to provide the ash necessary.

Advantages of this method are that operation is inexpensive and costly suplementary chemicals are not necessary. There are certain disadvantages, however, for when it becomes necessary to add large quantities of ash (say 4 to 8 grams of ash per gram solids), a large quantity of heat is required to incinerate the filter and centrifuge cakes because the ash added to the sludge absorbs moisture which must be evaporated.

This method using the filter-centrifuge combination is economically feasible for sludge quantities above 50 tons per day, such as occurs from a city with 100,000 inhabitants. For smaller sludge quantities the digested sludge or the fresh sludge may be subjected directly to the ash treatment and then filtered.

Applicants discovered that the amount of ash required can be lowered substantially if lime is added, in addition to the ash, prior to vacuum or pressure filtration of the sludge or the centrate. Small lime quantities can, at the same filterability, replace large quantities of ash; up to 50 to 75% of the ash requirement may be replaced by lime. These high filterabilities are not attainable through the addition of small quantities of lime alone. For example, when filtering sludge with addition of only ash, it is necessary to add 4 to 8 grams of ash per gram of solid matter. When lime is added, less than 1 gram is required along with 1 to 4 grams of ash in order to obtain the same filterability. The ash acts as a filter aid in two ways: one, it forms a supporting porous matrix for the amorphous sludge solids, and, two, it provides reactive lime for flocculation of the sludge. Lime is generally required in amounts of 20 to 50% of the weight of the dry sludge solids for the formation of a supporting matrix.

Simultaneous use of ash and lime lessens the water quantity retained by the filter cake and lowers operational costs. With this process sludge filtration can be carried out economically even in small clarification installations. The invention differs from sludge filtration using only ash in that the lime causes a flocculation reaction which is supported by finely divided ash. The ash aids in this reaction as well as aiding in development of this supporting matrix.

According to the invention, employment of lime and ash for improving filterability is suitable for dewatering both fresh and digested sludges. The ash required may be provided by incinerating the solids residue from the centrifuge and the filter or can be obtained from an outside source. About 65 to 123 lbs. of lime along with ash are required to treat 1000 gals. of sludge, the sludge being approximately 10% dry solids.

During incineration of the centrifuge or filter cake after treatment with ash and lime a part of the lime in the cake remains or again becomes active; this part may be reused by mixing it with fresh lime and ash to be added to the sludge. In this way, the additional lime required in a continuous operation is less than during initial start-up of the installation.

Ash from the incineration of sludges from domestic sewage is low in lime. The lime content is only about 2 to 10%. When filtering such sludges utilizing only ash, it is necessary to accumulate large ash quantities in order to improve the filterability of the sludge.

With sludges from mixed domestic and industrial sewages, a considerable portion of the lime added to the ash may form, after mixing or during combustion of the filter or centrifuge cake, insoluble calcium compounds. Thus, if the ash is recycled, the active lime content decreases with each passage through the incinerator. The ash mainly retains only its supporting matrix effect. In both of the above cases, a large amount of ash is required for an acceptable filter output which may, especially with ash which is low in lime, become economically impractical.

The method of the invention makes it possible to employ filtration with ash addition when the ash, because of reactions with sludge solids or of deficient lime content in the slidge, does not contain enough active lime for improving the filter output. By varying the quantities and the ratio of ash to lime, the filter output is maintained within wide limits independent of variations in the sludge composition. The supporting matrix, important to the consistency of the filter cake, can be improved by increasing the amount of ash. By increasing the lime addition flocculation of the sludge is increased, thus improving filterability. Most of the added lime can be recovered in the ash. For restoring or maintaining its activity as much as possble, combustion temperatures of 1300° to 1400° F. are often sufficient. When the ash is rich in calcium carbonate, as in the case of sludges from municipal sewage, combustion temperatures above 1550° are necessary for reactivation of the lime content. However, to reach these temperatures a high fuel oil addition may be required, thus lessening the economy of the total process. In such a case it is usually better to add both lime and ash to the sludge and maintain combustion temperatures in the range of 1300° to 1400° F.

It is possible to carry out the method of the invention without incinerating the dried sludge and use ash from a separate operation, as, for example, flyash from a large boiler plant. The ash, in such an operation, must be available within a reasonable distance and disposal means for the dewatered sludge must be available. Often these special requirements cannot be satisfied, and the ash resulting from the incineration of the filter or centrifuge cake is employed as a filter aid for the filtration of sludges or centrate. The advantage in using the ash from incineration of filter or centrifuge cake is that a part of the added lime can be reused by recycling the ash.

Addition of ash and lime to improve filterability is particularly adaptable to a sludge dewatering system using a centrifuge followed by filtration of the centrate.

Centrifuge cake resulting from centrifuging of digested or fresh sludge has a sufficiently high solid matter content and a sufficiently low water content to allow incineration without supplementary fuel. Usually, in this case, the ash yield is relatively small and is not sufficient as a filter aid for the filtration of the centrate.

If, in accordance with the invention, lime is added to the ash, the quantity of ash produced from incineration of the centrifuge cake is usually sufficient to obtain good filterability on a rotary filter or in a filter press. The filter cake can be used for soil improvement, or otherwise disposed of. A part of the filter cake may be burned to provide additional ash when combustion of the centrifuge cake does not furnish sufficient ash.

Since sludge incineration is carried out without the employment of supplementary fuel, it furnishes a heat surplus and may be advantageously employed to heat the centrate prior to filtration. In this way, a further improvement in the filter output is obtained. When sludge incineration is carried out in a fluidized bed incinerator, nearly all of the ash is discharged with the flue gas. By washing the flue gas with the centrate to be filtered the latter is heated and mixed with the ash, while flue gas is washed ash free. The heating is generally sufficient to kill some of the bacteria present in the centrate.

The method of the invention is applicable to digested sludge, fresh sludge, biological sludge, and to mixed sludges. Standard filters for vacuum or pressure filtration, for example, drum filters, filter presses, and the like may be used for carrying out this process. Filtration may extend to all of the sludge produced or only to the centrate resulting from a preceding centrifuging step.

The following examples serve to further illustrate the invention:

Example 1

A digested sludge, after the addition of lime and ash obtained from incineration of digested sludge, was filtered. The quantitative ratio of lime and ash added was varied.

The weight data relate to 1 gram of dry solids in the digested sludge. The filter yield is stated in gallons per square foot per hour.

| Addition: | Filter output, gallons/(sq. ft.)(hr.) |
| --- | --- |
| 4 grams ash and 0.4 gram lime | 28.8 |
| 2 grams ash and 0.8 gram lime | 28.8 |

Example 2

A digested sludge was in each case filtered after the addition of ash or of lime and finally after the addition of ash and lime. The weight data again relate to 1 gram of dry solids in the digested sludge. The filter output is defined as in Example 1.

| Addition: | Filter output, gallons/(sq. ft.)(hr.) |
| --- | --- |
| 8 grams ash | 16.9 |
| 1.6 grams lime | 1.18 |
| 4 grams ash and 0.4 gram lime | 19.5 |

It should be observed that when the ash and lime were both added, the ash required was reduced to one-half with a corresponding in filter output.

Example 3

A digested sludge with a dry solids content of 830 lbs./1,000 gals. was treated according to the invention. The centrifuge removed 60% of the solid matter as centrifuge cake with a solids content of 45%. The centrifuge cake was burned in a fluidized bed incinerator without supplementary fuel. The ash content produced was 60% by weight of the centrifuge cake. Accordingly, 265 gallons of the digested sludge yielded 79.5 lbs. of ash. The centrate was used to wash the off-gases from the incinerator. Approximately 1 gram of ash per gram of dry substance was introduced into the centrate and the centrate was heated to 122° F. Since these gases contained substantial $CO_2$, neutralization of the active lime content in the ash occured. Subsequently, 100 lbs. of lime/1,000 gallons of centrate was added, and a filter output of 7.37 gallons/(sq. ft.)(hr.) was attained on a rotary filter and of 1.7 gallons/(sq. ft.)(hr.) in a filter press. The dry-solids content of the filter cake was 38% with the rotary filter and 45% with the filter press.

When centrate was not prepared according to the invention, an ash quantity of 3 to 3.5 gram of ash per gram of dry solids was required to obtain a filter output of 7.37 gallons/(sq. ft.)(hr.). The dry-solids concentration obtained was about 40% with the rotary filter and about 50% with the filter press. This meant that, although the percent of water retained in the cake was slightly less than when lime was added, the total amount of water required to be removed by the filter was greater as more cake was produced due to addition of more ash.

The mode of operation of Example 3 can also be carried out with fresh sludge from a settling basin or the biological clarification step. In this case, because of the higher content of organic matter in the sludge, the ash content in the centrifuge discharge will be lower, so that less ash will be added to the centrate in the washer. Consequently, it is necessary either to increase the lime addition to about 18 grams/liter or else incinerate the filter cake to obtain additional ash.

We claim:

1. A process for dewatering organic sludges from the treatment of waste water comprising centrifuging the sludge into a highly dewatered centrifuge cake and a centrate containing fine and colloidal solids, adding sufficient ash and lime to said centrate so that the lime causes a flocculation reaction supported by the ash, and filtering the lime and ash-treated centrate to recover a filtrate substantially free of solids and a highly dewatered filter cake.

2. A process according to claim 1, wherein the ash added to the centrate is flyash.

3. A process for dewatering organic sludge from the treatment of waste water comprising centrifuging the sludge into a highly dewatered centrifuge cake portion and a sludge-water centrate containing fine and colloidal solids, adding ash and lime to the sludge-water centrate, filtering said centrate treated with lime and ash into a highly dewatered filter cake and a sludge-water filtrate substantially free of solids, incinerating said filter cake and said centrifuge cake within a temperature range to provide ash and to reactivate the lime contained therein, and utilizing part of said ash and reactivated lime resulting from incinerating said filter and centrifuge cakes as the ash and lime added to said sludge-water centrate.

4. The process according to claim 3, wherein said organic sludge is fresh sludge.

5. The process according to claim 3, wherein said organic sludge is digested sludge.

6. The process according to claim 3, wherein said organic sludge is mixed sludge.

7. A process for dewatering organic sludge from the treatment of waste water comprising centrifuging the sludge into a highly dewatered centrifuge cake portion and a sludge-water centrate containing fine and colloidal solids, incinerating said centrifuge cake into ash in a fluidized bed incinerator so that most of said ash is mixed with and discharged with the off-gases produced, washing said off-gas and ash mixture with said sludge-water centrate to introduce ash into the centrate and to heat the centrate, adding lime to the ash and centrate mixture, and filtering the ash and centrate mixture into a highly dewatered filter cake and a filtrate substantially free of solids.

8. The process according to claim 7, wherein said filter cake is incinerated and part of the ash produced is added to the ash and centrate mixture prior to filtration.

References Cited

UNITED STATES PATENTS

| 1,892,681 | 1/1933 | Rankin | 210—152 X |
| 2,072,154 | 3/1937 | Butterfield | 210—45 |
| 2,359,748 | 10/1944 | Clemens | 210—45 |
| 3,226,319 | 12/1965 | Schick | 210—52 |

FOREIGN PATENTS 1,290,712  3/1962  France.

OTHER REFERENCES

Rudolfs, W.: Concentration of Activated Sludge, etc., Sewage Works Journal, vol. 15, July 1943, pp. 642–646, 651–654, 656 and 657.

Metcalf, L., et al.: American Sewerage Practice, vol. III, Disposal of Sewage, third edition, 1935, McGraw-Hill, New York, pp. 741–747.

MORRIS O. WOLK, *Primary Examiner.*

MICHAEL E. ROGERS, *Examiner.*